United States Patent
Haupt et al.

(10) Patent No.: US 12,345,299 B2
(45) Date of Patent: Jul. 1, 2025

(54) SHAFT COUPLING AND SHAFT FOR THE SHAFT COUPLING

(71) Applicant: GKN Automotive Ltd., Birmingham (GB)

(72) Inventors: Jan Haupt, Kürten (DE); Moritz Abbenhaus, Troisdorf (DE); Thomas Weckerling, St. Augustin (DE); Maximilian Werkhausen, Overath (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/682,970

(22) PCT Filed: Oct. 1, 2021

(86) PCT No.: PCT/EP2021/077153
§ 371 (c)(1),
(2) Date: Feb. 12, 2024

(87) PCT Pub. No.: WO2023/051938
PCT Pub. Date: Apr. 6, 2023

(65) Prior Publication Data
US 2025/0137495 A1    May 1, 2025

(51) Int. Cl.
*F16D 11/10*    (2006.01)
*F16C 3/02*    (2006.01)
*F16D 15/00*    (2006.01)

(52) U.S. Cl.
CPC ............... *F16D 15/00* (2013.01); *F16C 3/02* (2013.01)

(58) Field of Classification Search
CPC ......... F16D 2023/123; F16D 2011/002; F16D 11/10; F16D 15/00; F16D 11/14
See application file for complete search history.

(56) References Cited

U.S. PATENT DOCUMENTS 2,861,461 A * 11/1958 Kreidler .................. F16D 21/04
                                                                 74/371
2014/0284166 A1* 9/2014 Ege ........................ F16D 21/04
                                                                 192/69.5
2018/0180144 A1* 6/2018 Legrand .............. F16H 25/2252

FOREIGN PATENT DOCUMENTS

DE            3701898 A1    8/1988
DE      10 2010 051949 A1    5/2012
DE        102016110389 A1   12/2017
(Continued)

OTHER PUBLICATIONS

International Search Report and Written Opinion for PCT/EP2021/077153 mailed Jun. 17, 2022 (11 pages; with English translation).

*Primary Examiner* — Ernesto A Suarez
*Assistant Examiner* — Lillian T Nguyen
(74) *Attorney, Agent, or Firm* — Reising Ethington P.C.

(57) ABSTRACT

A shaft coupling for the switchable connection of a first shaft to a second shaft arranged coaxially thereto, comprises the first shaft, which has on a circumferential surface a plurality of first ball tracks extending along an axis of rotation over at least a first section and a second section, the first ball tracks being arranged spaced apart from one another along a circumferential direction in the first section by first webs and in the second section by second webs, as well as a plurality of first balls arranged in the first section and a plurality of second balls arranged in the second section.

11 Claims, 3 Drawing Sheets

(56) References Cited

FOREIGN PATENT DOCUMENTS

DE 102019129818 A1 5/2021
WO 2006018096 A1 2/2006

* cited by examiner

SHAFT COUPLING AND SHAFT FOR THE SHAFT COUPLING

CROSS-REFERENCE TO RELATED APPLICATION

This application is a national stage of, and as such claims priority to, Patent Cooperation Treaty Application No. PCT/EP2021/077153, filed on Oct. 1, 2021, which application is hereby incorporated herein by reference in its entirety.

BACKGROUND

DE 10 2019 129 818 A1 discloses a shaft coupling for the switchable connection of a first shaft to a second shaft. The shafts have ball tracks that form track pairs with the ball tracks of a sleeve. The balls are displaced by moving the sleeve along the axis of rotation. One of the shafts has apertures between the ball tracks into which the balls can be displaced. If the balls are arranged in the area of the apertures, the shafts can be rotated independently of each other. If the balls are arranged outside the apertures, i.e. between the webs of the ball tracks, the shafts are coupled to each other.

In shaft couplings of this type, the individual ball tracks of a shaft are arranged at an angular distance from each other along the circumferential direction. These angular distances must therefore be bridged in order to change from the decoupled position to the coupled position, so that the balls can be shifted into the ball tracks or into the area between the webs. The relatively large angular distance requires a long switching time to establish the coupled position. Switching is only possible in a very small angular range, which is determined by the (excess) size of the inlet opening of the ball tracks in relation to the balls. Furthermore, this severely restricts the difference in rotational speeds of the shafts to be coupled that is permissible for switching.

However, it is not possible to increase the inlet opening or the width of the ball track, as this worsens the NVH (noise-vibration-harshness) behavior of the shaft coupling (greater play of the balls in the ball tracks compared to the circumferential direction). A reduction in the angular distance, e.g. by increasing the number of ball tracks, leads to a reduction in the transmittable torque. A smaller angular distance on a larger effective diameter (ball tracks are arranged on a larger diameter of the shaft) leads to an increased installation space requirement, which often cannot be provided.

DE 37 01 898 A1 discloses a coupling with a switching sleeve.

WO 2006/018096 A1 discloses a longitudinal displacement unit for connecting two shafts.

DE 10 2010 051 949 A1 discloses a device for creating and releasing a rotationally fixed connection between two shafts.

DE 10 2016 110 389 A1 discloses a vibration decoupling arrangement via which two shafts can be connected to one another.

SUMMARY

The disclosure includes, a shaft coupling of small size which can transmit large torques. Short actuation paths and low switching forces can be to be realized. Furthermore, it is possible to shift the shaft coupling even if there are large differences in the rotational speeds of the shafts.

The disclosure includes a shaft coupling for the switchable connection of a first shaft to a second shaft, which are arranged coaxially to one another and have a common axis of rotation. The disclosure also relates to a shaft of the shaft coupling. Via the shaft coupling, the shafts can be connected to one another in a rotationally fixed manner in order to transmit torques (i.e. cannot be rotated relative to one another) (coupled position) or separated from one another (decoupled position). In the decoupled position, the shafts can rotate independently of each other, whereby no torque is transmitted.

The features listed individually in the claims can be combined with each other in a technologically meaningful way and can be supplemented by explanatory facts from the description and/or details from the figures, whereby further embodiments are shown.

A shaft coupling described herein comprises at least the first shaft and a plurality of first balls and second balls. The first shaft has, on a circumferential surface, a plurality of first ball tracks extending along an axis of rotation over at least a first section and a second section. The first ball tracks are spaced apart from one another along a circumferential direction in the first section by first webs and in the second section by second webs. The plurality of first balls is arranged (in each position of the shaft coupling) in the first section. The plurality of second balls is arranged (in each position of the shaft coupling) in the second section. The first ball tracks are connected to one another in the first section via first apertures arranged in alignment with one another along the circumferential direction and in the second section via second apertures arranged in alignment with one another along the circumferential direction.

The shaft coupling can be switched at least (or, in an example, exclusively) between two positions. The balls can be moved between the positions within the respective section along the ball tracks. The balls are arranged in the circumferential direction in a coupled position in alignment with the webs and in an decoupled position in alignment with the apertures. In the first section, a first end face of the first webs pointing towards the first apertures is smaller than in the second section a second end face pointing towards the second apertures.

The proposed shaft coupling enables the transmission of high torques even though being of a small size. Torques can be transmitted via a large number of balls.

The ball tracks extend in an example parallel to the axis of rotation and possibly perpendicular to a circumferential direction. The ball tracks have a track base that is flanked on both sides by track side walls formed by the webs. The track base extends in an example at a constant distance from the axis of rotation and possibly parallel to the axis of rotation. The track base is arranged either on a smallest or a largest diameter of the ball track. The side walls of the track support the balls relative to the circumferential direction. The web with the end face is arranged between the side walls of neighboring ball tracks.

In an example, several balls are arranged in each first ball track, e.g., two or even more than two balls.

During operation of the shaft coupling, the first balls are in an example permanently arranged in the first section and the second balls are permanently arranged in the second section. When the shaft coupling is switched, the balls are displaced along the axis of rotation within the respective section. If the balls are therefore arranged in the respective apertures in a decoupled position of the shaft coupling, the balls can be moved relative to the first shaft along the circumferential direction. The first shaft can therefore be freely rotated relative to the balls. To switch the shaft coupling to the coupled position, the balls enter the ball track of the respective section. In the coupled position, the balls are aligned with the webs in the circumferential direction so that rotation of the first shaft relative to the balls is not possible.

As a result of the reduction in the size of the first end face compared to the second end faces, it is easier for the first balls to enter the first ball tracks. In an example, the angular distance between two first ball tracks is thus actually reduced, whereby a clearance between the first balls and the webs of the first ball track that is present in relation to the circumferential direction is also increased, at least in the area of the first end face.

On the one hand, this enables greater differences in the rotational speeds of the shafts to be coupled when coupling the shafts. On the other hand, the switching time for establishing the coupled position is shortened as a result of the reduced angular distance.

The first end face of the first webs is reduced in an example in such a way that an inlet opening of the first ball track is enlarged. In an example, the inlet opening of the first ball track is enlarged in the circumferential direction. Compared to the second inlet opening of the first ball track in the second section, the first inlet opening is enlarged in an example by at least 2%, or by at least 4%, or by at least 8%.

In an example, a chamfer adjoins the first end face of the first web. In an example, the chamfer is inclined towards one of the first ball tracks arranged adjacent to the first web. The chamfer forms a first inlet opening of the first ball track that is enlarged in the circumferential direction. As a result of the chamfer, a width of the first ball track tapers increasingly starting from the first inlet opening and along the axis of rotation. The width of the first ball track extending in the circumferential direction is therefore maximum at the position along the axis of rotation at which the first end face is arranged and tapers increasingly from there to the (then constant) minimum width of the first ball track.

In an example, a chamfer is arranged on each first end face. This is arranged in an example on the same side walls of the first webs.

The minimum width of the first ball track in the first section is in an example equal to the (minimum) width of the first ball track in the second section. In an example, the first ball track in the second section has a constant width.

In an example, the chamfer comprises a recess of the edge that forms the transition between the end face and the side wall of the web. The end face present at a position along the axis of rotation defines in an example the size or width of the inlet opening of the first ball track.

In an example, the first end face of a first web is adjoined by two chamfers. In an example, each chamfer is inclined towards a different one of the first ball tracks arranged adjacent to the first web. The chamfers form the first inlet opening of the first ball tracks, which is enlarged in the circumferential direction. As a result of the chamfers, a width of the first ball tracks tapers increasingly starting from the first inlet opening and along the axis of rotation.

In an example, two chamfers are arranged on each first end face.

In an example, the first end face (i.e. the area of the first end face) is at most 95%, or most 85%, or at most 75% of the second end face (i.e., the area of the second end face).

In an example, the first balls are arranged in the decoupled position along the axis of rotation at a first distance from the first end faces and the second balls are arranged at a second distance from the second end faces. In an example, the first distance is less than the second distance.

The difference between the first distance and the second distance is dimensioned in an example such that the first balls initially enter the first ball tracks from the first apertures (and via the enlarged first inlet openings) along the axis of rotation. As a result of the increasing narrowing of the width starting from the first inlet opening, the first balls are increasingly aligned with respect to the first ball tracks as the first balls move along the axis of rotation. In an example, the second spacing is such that the second balls only enter the first ball tracks in the second section from the second openings when the first balls in the first section have reached the minimum width.

This makes it easier to thread the first balls through the first section. By threading only the first balls into the first ball tracks and by successively better alignment of the first balls to the first shaft via the chamfers, the second balls can be aligned with the first ball tracks in the second section. This can reduce the switching times and simplify the switching process. The transmission of a torque is not impaired in the process.

In an example, the shaft coupling additionally comprises at least the second shaft with a plurality of second ball tracks extending along the axis of rotation as well as a sleeve with third ball tracks at least partially covering the first ball tracks and the second ball tracks along the axis of rotation. The shaft coupling also includes third balls. The first and second balls are arranged in first pairs of tracks formed by the first ball tracks with the third ball tracks and the third balls are arranged in second pairs of tracks formed by the second ball tracks with the third ball tracks. The balls can be displaced between the positions along the ball tracks by moving the sleeve along the axis of rotation, so that in the coupled position the shafts are non-rotatably connected to each other and in the uncoupled position the first shaft and the second shaft can be rotated relative to each other.

In an example, the balls are moved along the shafts as part of a rolling movement (and not by a sliding movement). As a result of the rolling movement of the balls, it is possible to activate the shaft coupling with little force.

In an example, the shafts are arranged next to each other along the axis of rotation and the sleeve extends in a radial direction on the outside beyond the first and second ball tracks. The third ball tracks form outer ball tracks (i.e., arranged on the outside in the radial direction) and form the first track pairs with the inner first ball tracks (i.e., arranged on the inside in the radial direction) and the second track pairs with the inner second ball tracks.

Alternatively, the first ball tracks and the second ball tracks overlap each other along the axis of rotation and the sleeve is arranged along a radial direction between the first and second ball tracks. One shaft has inner ball tracks (arranged on the inside in the radial direction) and the other shaft has outer ball tracks (arranged on the outside in the radial direction). The sleeve has inner third ball tracks and outer third ball tracks.

In an example, the first shaft has a plurality of second sections which are arranged adjacent to one another along the axis of rotation.

In an example, a cage is arranged between the sleeve and each shaft, the (first and second) balls being arranged at fixed distances from one another via the cage, at least with respect to an axial direction extending along the axis of rotation.

The distances between the balls arranged in the second ball tracks can be different than the distances between the balls arranged in the first ball tracks (but can also be identical).

In an example, the (respective) cage is not connected to the sleeve, but is displaced via the balls along the axial direction. As the balls are always arranged in the third ball tracks, the cage rotates together with the sleeve. By displacing the sleeve, in an example the balls—and the cage via the balls—can be displaced along the axial direction, in an example (exclusively) as part of a rolling movement. This allows the balls to be displaced in the sections so that a decoupled or coupled position of the shaft coupling can be achieved.

In an example, only the first ball tracks are connected to each other along the circumferential direction via apertures. The first ball tracks are connected to each other in a first section via first apertures and in a second section via second apertures along a circumferential direction. This allows the first and second balls to be displaced along the circumferential direction on a diameter (corresponding to the track base of the first ball track) along the circumferential direction. The first apertures in the first section and the second apertures in the second section are arranged in alignment with one another, particularly along the circumferential direction. The apertures in the respective section therefore form a ball track that runs exclusively in the circumferential direction.

By displacing the sleeve along the axis of rotation, the first and second balls can be displaced along the (first, second and third) ball tracks so that the first and second balls can be arranged in the respective apertures. This allows the balls to be displaced along the ball track formed by the apertures and extending in the circumferential direction, so that the balls can be displaced relative to the first shaft along the circumferential direction. This allows the sleeve and the second shaft to be rotated relative to the first shaft. In an example, all balls arranged on the first shaft must be arranged in such sections with apertures so that the sleeve with the balls arranged in the first ball tracks can be rotated relative to the first shaft.

The shafts are non-rotatably connected to each other if the balls arranged in the first ball tracks are arranged outside the apertures and in alignment with the webs along the circumferential direction.

In an example, a plurality of rows of balls is arranged in at least one of the pairs of tracks, with the balls of one row being arranged at a position along the axis of rotation and adjacent to one another in the circumferential direction. In an example, the number of rows on the first shaft corresponds to the number of (first and second) sections provided on the first shaft.

In an example, the sleeve can be displaced relative to the shafts along an axial direction extending along the axis of rotation by means of an actuating device.

Various actuating devices can be used. Due to the low friction between balls and ball tracks (due to rolling friction, which is lower than sliding friction), only low actuating forces are required to switch the shaft coupling.

A (first) shaft for the shaft coupling described is also proposed. On a circumferential surface, the shaft has a plurality of first ball tracks extending along an axis of rotation over at least a first section and a second section. The first ball tracks are spaced apart from one another along a circumferential direction in the first section by first webs and in the second section by second webs. In the first section, the first ball tracks are connected to one another along the circumferential direction via first apertures arranged in alignment with one another along the circumferential direction and in the second section via second apertures arranged in alignment with one another along the circumferential direction. In the first section, a first end face of the first webs pointing towards the first apertures is smaller than in the second section a second end face pointing towards the second apertures.

The explanations relating to the shaft coupling and in an example to the first shaft described in connection therewith are in an example transferable to the shaft and vice versa.

In an example, reference is made to the shaft coupling according to DE 10 2019 129 818 A1. The explanations given there regarding the arrangement of the first shaft, the second shaft, the sleeve and the cage(s) are transferable to the shaft arrangement described here.

The use of indefinite articles ("a", "an"), in an example in the claims and the description reproducing them, is to be understood as such and not as a number word. Accordingly, terms or components introduced thereby are to be understood in such a way that they are present at least once and, in an example, can also be present several times.

It should be noted that the number words used here ("first", "second", . . . ) are primarily (only) used to distinguish between several similar objects, quantities or processes, i.e. in an example they do not necessarily specify any dependency and/or sequence of these objects, quantities or processes in relation to one another. If a dependency and/or sequence is required, this is explicitly stated here or is obvious to the person skilled in the art when studying the specific embodiment described. Insofar as a component may occur more than once ("at least one"), the description of one of these components may apply equally to all or some of the plurality of these components, but this is not mandatory.

BRIEF SUMMARY OF THE DRAWINGS

The invention and the technical context are explained in more detail below with reference to the accompanying figures. It should be noted that the invention is not intended to be limited by the variants given. In an example, unless explicitly shown otherwise, it is also possible to extract partial aspects of the facts explained in the figures and to combine them with other components and findings from the present description. In an example, it should be noted that the figures and especially the proportions shown are only schematic. The figures show.

DESCRIPTION

Figure 1:
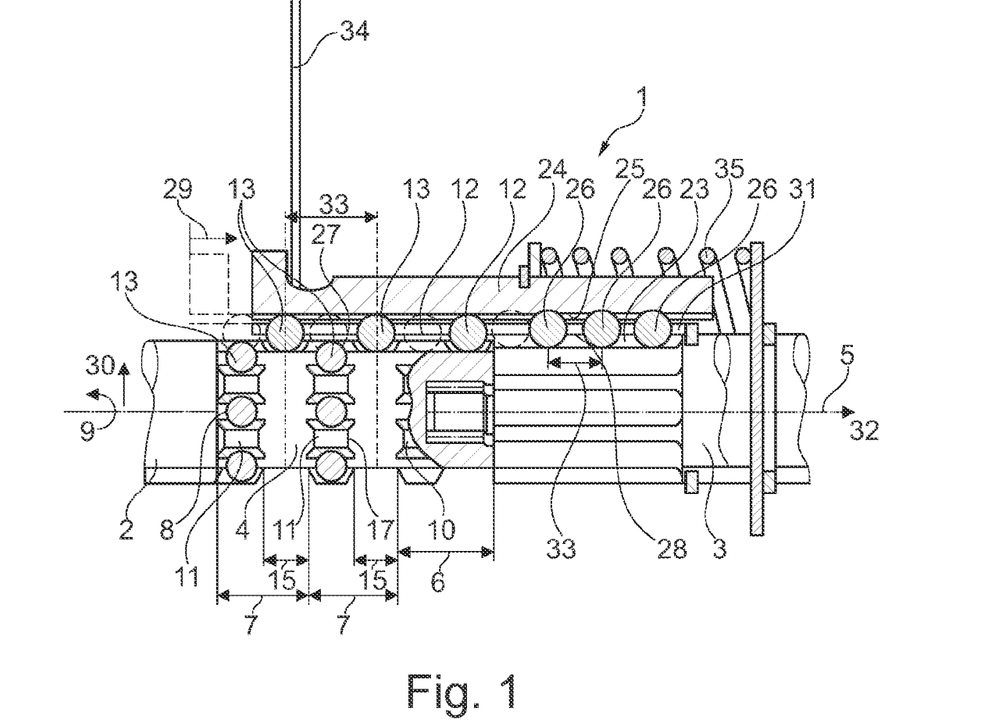
FIG. 1: a shaft coupling in a side view, partially in section.

FIG. 1 shows a shaft coupling 1 in a side view, partially in section. The shaft coupling 1 is used for the switchable connection of a first shaft 2 to a second shaft 3. The shafts are arranged coaxially to each other and have a common axis of rotation 5.

The shaft coupling 1 comprises the first shaft 2 and a plurality of first balls 12 and second balls 13. On a circumferential surface 4, the first shaft 2 has a plurality of first ball tracks 8 extending along an axis of rotation 5 over at least a first section 6 and a second section 7. The first ball tracks 8 are spaced apart from one another along a circumferential direction 9 in the first section 6 by first webs 10 and in the second section 7 by second webs 11. The plurality of first balls 12 is arranged (in any position of the shaft coupling 1) in the first section 6. The plurality of second balls 13 is arranged (in each position of the shaft coupling 1) in the second section 7. The first ball tracks 8 are connected to one another in the first section 6 via first apertures 14 (not shown here, see FIG. 9) arranged in alignment with one another along the circumferential direction 9 and in the second section 7 via second apertures 15 arranged in alignment with one another along the circumferential direction 9.

The shaft coupling 1 can be switched only between two positions. The balls 12, 13 can be displaced between the positions within the respective section 6, 7 along the ball tracks 8, 23. The balls 12, 13 are arranged in the circumferential direction 9 in a coupled position in alignment with the webs 10, 11 (shown here) and in a decoupled position (indicated here) in alignment with the apertures 14, 15. In the first section 6, a first end face 16 of the first web 10 (see FIG. 9) pointing towards the first apertures 14 is smaller than a second end face 17 pointing towards the second apertures 15 in the second section 7.

The shaft coupling 1 additionally comprises the second shaft 3 with a plurality of second ball tracks 23 extending along the axis of rotation 5 as well as a sleeve 24 with third ball tracks 25 at least partially covering the first ball tracks 8 and the second ball tracks 23 along the axis of rotation 5. Furthermore, the shaft coupling 1 additionally comprises third balls 26. The first and second balls 12, 13 are arranged in first track pairs 27 formed by the first ball tracks 8 with the third ball tracks 25 and the third balls 26 are arranged in second track pairs 28 formed by the second ball tracks 23 with the third ball tracks 25. The balls 12, 13, 26 can be displaced between the positions along the ball tracks 8, 23, 25 by displacing the sleeve 24 along the axis of rotation 5, so that in the coupled position the shafts 2, 3 are connected to each other in a rotationally fixed manner and in the decoupled position the shafts 2, 3 can be rotated relative to each other.

The shafts 2, 3 are arranged next to each other along the axis of rotation 5 and the sleeve 24 extends in a radial direction 30 outwards beyond the first and second ball tracks 8, 23. The third ball tracks 26 form outer ball tracks (i.e., arranged on the outside in the radial direction 30) and with the inner first ball tracks 8 (i.e., arranged on the inside in the radial direction 30) form the first track pairs 27 and with the inner second ball tracks 23 form the second track pairs 28.

The first shaft 2 has a plurality of second sections 7, which are arranged adjacent to one another along the axis of rotation 5.

A cage 31 is arranged between the sleeve 24 and each shaft 2, 3, wherein the (first and second) balls 12, 13 are arranged at fixed distances 33 from one another via the cage 31 relative to an axial direction 32 extending along the axis of rotation 5.

During operation of the shaft coupling 1, the first balls 12 are permanently arranged in the first section 6 and the second balls 13 are permanently arranged in the second section 7. When the shaft coupling 1 is switched, the balls 12, 13 are displaced along the axis of rotation 5 within the respective section 6, 7. If the balls 12, 13 are thus arranged in a decoupled position of the shaft coupling 1 in the respective openings 14, 15, the balls 12, 13 can be moved relative to the first shaft 2 along the circumferential direction 9. The first shaft 2 can therefore be freely rotated relative to the balls 12, 13. To switch the shaft coupling 1 to the coupled position, the balls 12, 13 enter the first ball track 8 of the respective section 6, 7. In the coupled position, the balls 12, 13 are arranged in alignment with the webs 10, 11 in the circumferential direction 9, so that rotation of the first shaft 2 relative to the balls 12, 13 is not possible.

The balls 12, 13, 26 are assigned either to the first ball tracks 8 or to the second ball tracks 23. Each ball 12, 13, 26 is therefore only arranged either in a first ball track 8 or in a second ball track 23, whereby no ball 12, 13, 26 is displaced from the first shaft 2 to the second shaft 3 and vice versa, even when the shaft coupling 1 is switched.

The sleeve 24 can be displaced relative to the shafts 2, 3 along an axial direction 32 extending along the axis of rotation 5 by means of an actuating device 34. The sleeve 24 can be displaced against the action of a spring element 35, so that the sleeve 24 can be returned automatically. The first spring element 35 is realized by a compression spring. Via the actuating device 34, the sleeve 24 can be displaced in the direction of a displacement 29 from an initial position (see the position of the sleeve 24 shown in dashed lines in FIG. 1) against the spring force for switching the shaft coupling 1, whereby the sleeve 24 can be returned to the initial position solely by the spring force.

Figure 2:
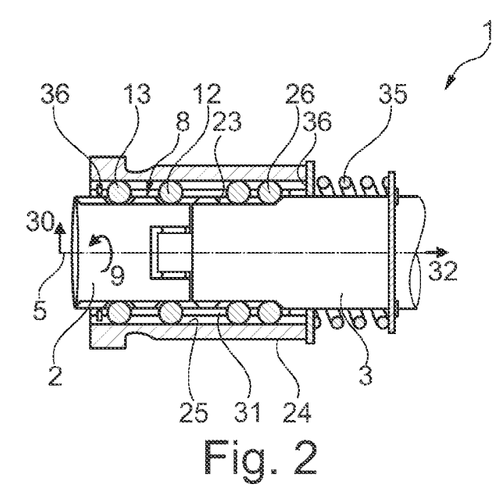
FIG. 2: a shaft coupling in a side view, partially in section, in a decoupled position.
Figure 3:
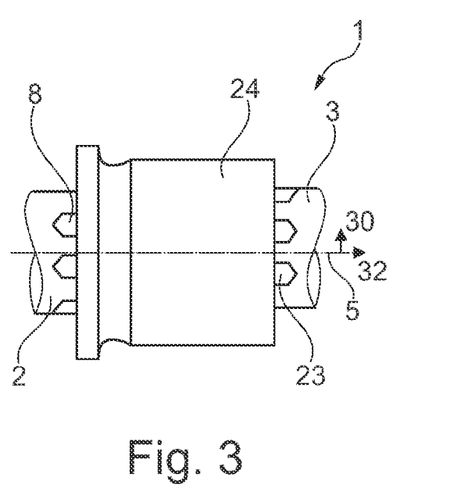
FIG. 3: a side view of the shaft coupling according to FIG. 2.

FIG. 2 shows a shaft coupling 1 in a side view, partially in section, in a decoupled position. FIG. 3 shows a side view of the shaft coupling 1 according to FIG. 2. FIGS. 2 and 3 are described together below. Reference is made to the comments on FIG. 1.

The shafts 2 and 3 are arranged coaxially to each other and have a common axis of rotation 5. The shaft coupling 1 comprises the first shaft 2 and a plurality of first balls 12 and second balls 13. On a circumferential surface 4, the first shaft 2 has a plurality of first ball tracks 8 extending along an axis of rotation 5 over at least a first section 6 and a second section 7. The shaft coupling 1 also comprises the second shaft 3 with a plurality of second ball tracks 23 extending along the axis of rotation 5 and a sleeve 24 with third ball tracks 25 at least partially covering the first ball tracks 8 and the second ball tracks 23 along the axis of rotation 5. The shaft coupling 1 also comprises third balls 26.

In contrast to FIG. 1, two rows of balls 12, 13, 26 are arranged here in each of the pairs of tracks 27, 28. The balls 12, 13 are arranged in the two sections 6, 7 of the first ball tracks 8 or the first shaft 2. The first ball tracks 8 are connected to each other in a first section 6 via first apertures 14 and in a second section 7 via second apertures 15 along a circumferential direction 9. The sections 6, 7 are arranged next to each other along the axial direction 32. If the balls 12, 13 are therefore arranged in alignment with the webs 10, 11, torques can be transmitted between the sleeve 24 and the first shaft 2 via the balls 12, 13. If the balls 12, 13 are arranged in alignment with the apertures 14, 15, the balls 12, 13 together with the second shaft 3 and the sleeve 24 as well as the cage 31 can be freely rotated relative to the first shaft 2 or displaced along the circumferential direction 9.

A cage 31 is arranged between the sleeve 24 and the shafts 2, 3, whereby the balls 12, 13, 26 are arranged via the cage 31 at fixed distances 33 from one another relative to an axial direction 32 extending along the axis of rotation 5.

The cage 31 is not connected to the sleeve 24, but is displaced along the axial direction 32 via the balls 12, 13, 26 moved by the sleeve 24. The sleeve 24 has stops 36 on which the cage 31 is supported relative to the axial direction 32. The cage 31 can be aligned with the sleeve 24 along the axial direction 32 by means of the stops 36.

Since the balls 12, 13, 26 are always arranged in the third ball tracks 25, the cage 31 rotates together with the sleeve 24. The cage 31 and the balls 12, 13, 26 can be displaced along the axial direction 32 via a displacement 29 of the sleeve 24. This allows the balls 12, 13 to be displaced in the sections 6, 7 so that a decoupled position of the shaft coupling 1 is achieved (see FIG. 2).

Figure 4:
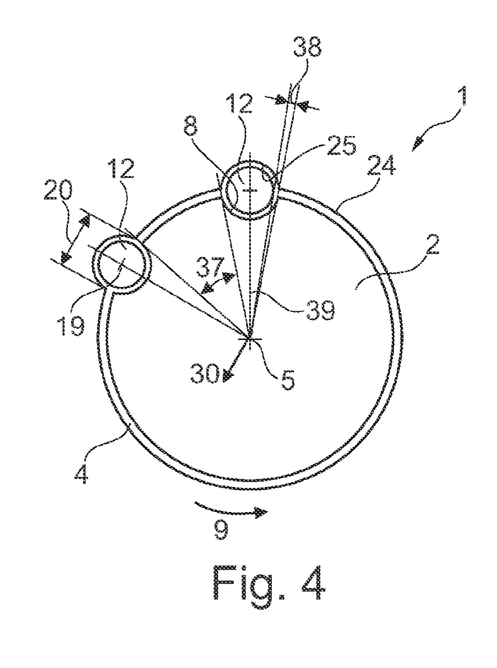
FIG. 4: a first variant of a first shaft in a view along the axis of rotation.
Figure 5:
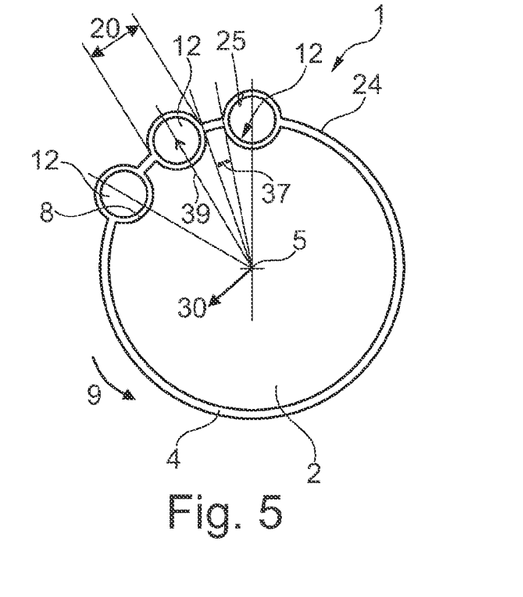
FIG. 5: a second variant of a first shaft in a view along the axis of rotation.
Figure 6:
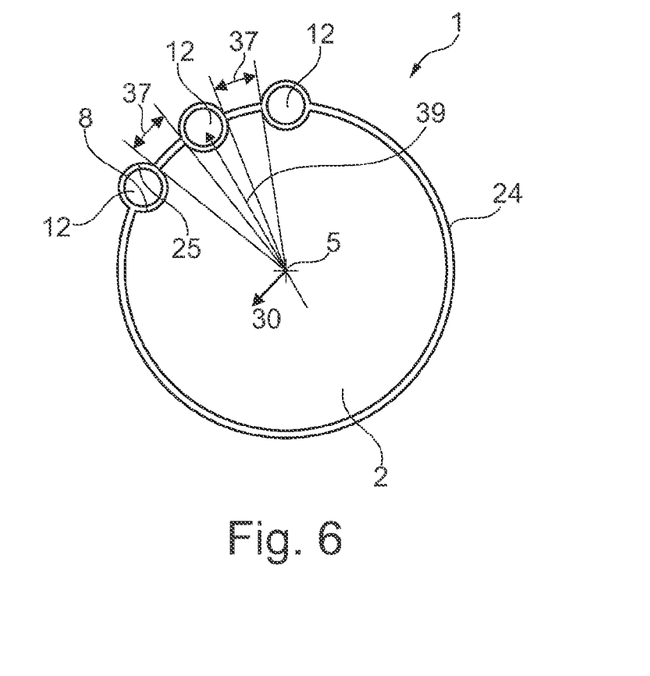
FIG. 6: a third variant of a first shaft in a view along the axis of rotation.

FIG. 4 shows a first variant of a first shaft 2 in a view along the axis of rotation 5. FIG. 5 shows a second variant of a first shaft 2 in a view along the axis of rotation 5. FIG. 6 shows a third variant of a first shaft 2 in a view along the axis of rotation 5. Reference is made to the comments on FIGS. 1 to 3. FIGS. 4 to 6 are described together below.

In shaft couplings 1, the individual first ball tracks 8 of a first shaft 2 are arranged at an angular distance 37 from each other along the circumferential direction 9 (see FIG. 4). These angular distances 37 must therefore be bridged in order to change from the decoupled position to the coupled position, so that the balls 12, 13 can be displaced into the first ball tracks 8 or into the area between the webs 10, 11. The relatively large angular distance 37 requires a long switching time to establish the coupled position. Switching is only possible in a very small angular range 38, which is determined by the (excess) size of the first inlet opening 19 of the first ball tracks 8 in relation to the balls 12, 13. Furthermore, this severely restricts the difference in rotational speeds of the shafts 2, 3 to be coupled that is permissible for switching.

However, it is not possible to increase the first inlet opening 19 or the width 20 of the first ball track 8, as this would worsen the NVH (noise-vibration-harshness) behavior of the shaft coupling 1 (greater play of the balls 12, 13 in the first ball tracks 8 in relation to the circumferential direction 9). A reduction in the angular distance 37, e.g. by increasing the number of first ball tracks 8 (see FIG. 5), leads to a reduction in the transmissible torque. A smaller angular distance 37 on a larger effective diameter 39 (first ball tracks 8 are arranged on a larger diameter of the first shaft 2, see FIG. 6) leads to an increased space requirement, which often cannot be provided.

Figure 7:
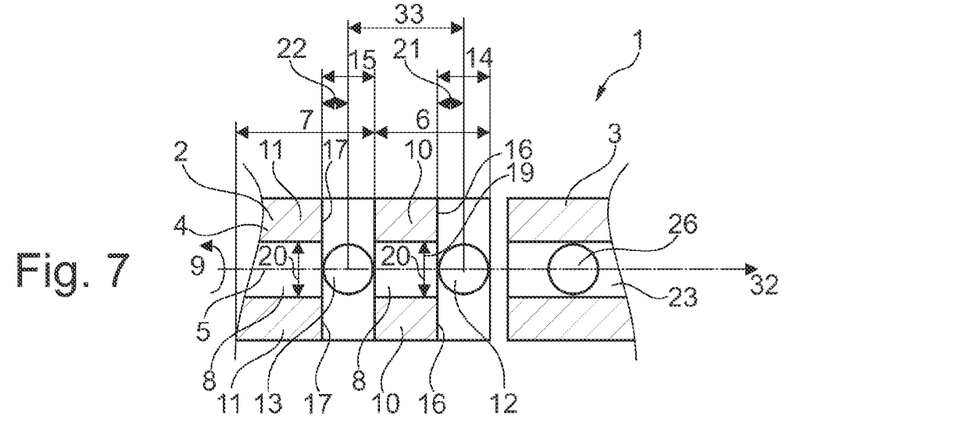
FIG. 7: a detail of a known shaft coupling, which is in a decoupled position, in a view along a radial direction.
Figure 8:
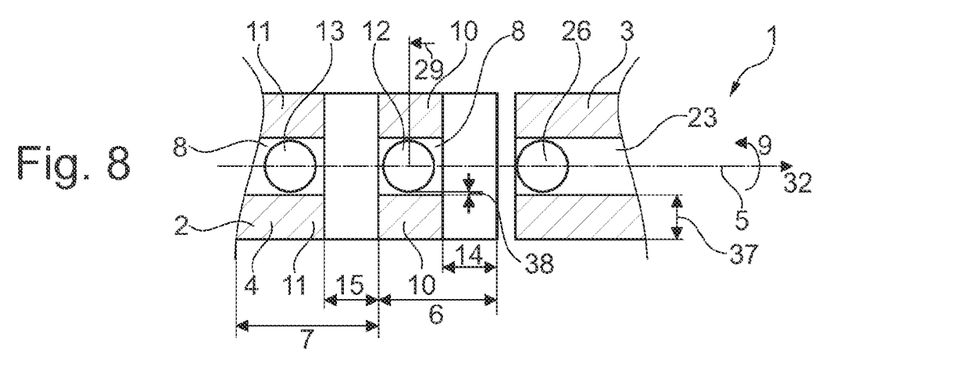
FIG. 8: the detail according to FIG. 7, with the shaft coupling in a coupled position, in a view along a radial direction.

FIG. 7 shows a detail of a known shaft coupling 1, which is in a decoupled position, in a view along a radial direction 30. FIG. 8 shows the detail according to FIG. 7, with the shaft coupling 1 in a coupled position, in a view along a radial direction 30. FIGS. 7 and 8 are described together in the following.

The shaft coupling 1 comprises the first shaft 2 and a plurality of first balls 12 and second balls 13. The first shaft 2 has, on a circumferential surface 4, a plurality of first ball tracks 8 extending along an axis of rotation 5 over at least a first section 6 and a second section 7. The shaft coupling 1 also comprises the second shaft 3 with a plurality of second ball tracks 23 extending along the axis of rotation 5, in which third balls 26 are arranged.

The first ball tracks 8 are spaced apart from one another along a circumferential direction 9 in the first section 6 by first webs 10 and in the second section 7 by second webs 11. The plurality of first balls 12 is arranged (in each position of the shaft coupling 1) in the first section 6. The plurality of second balls 13 is arranged (in each position of the shaft coupling 1) in the second section 7. The first ball tracks 8 are connected to one another in the first section 6 via first apertures 14 arranged in alignment with one another along the circumferential direction 9 and in the second section 7 via second apertures 15 arranged in alignment with one another along the circumferential direction 9.

The shaft coupling 1 can be switched only between two positions. The balls 12, 13 can be displaced between the positions within the respective section 6, 7 along the ball tracks 8, 23. The balls 12, 13 are arranged in the circumferential direction 9 in a coupled position in alignment with the webs 10, 11 (FIG. 8) and in a decoupled position (FIG. 7) in alignment with the apertures 14, 15. The first end face 16 of the first webs 10 facing towards the first apertures 14 is provided in the same way as a second end face 17 facing towards the second apertures 15 in the second section 7.

In the decoupled position, the first balls 12 are arranged along the axis of rotation 5 at a first distance 21 from the first end faces 16 and the second balls 13 are arranged at an equally large second distance 22 from the second end faces 17.

When the balls 12, 13 are displaced 29 along the first ball track 8, the balls 12, 13 simultaneously thread into the areas of the first ball tracks 8 delimited by the webs 10, 11 relative to the circumferential direction 9.

Figure 9:
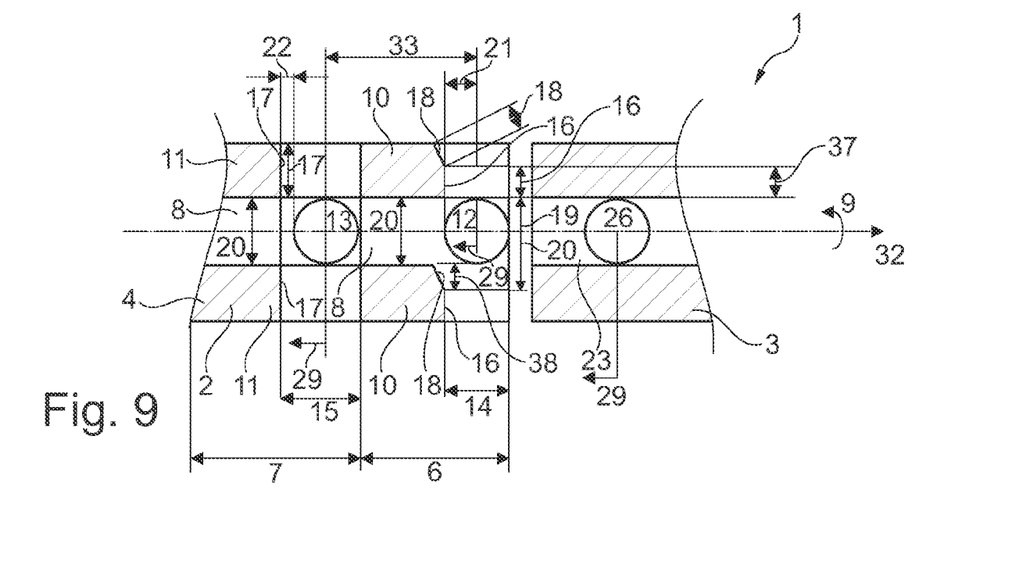
FIG. 9: a detail of a shaft coupling that is in a decoupled position, in a view along a radial direction.

FIG. 9 shows a detail of a shaft coupling 1, which is in a decoupled position, in a view along a radial direction 30. Reference is made to the comments on FIGS. 1 to 8.

The shaft coupling 1 comprises the first shaft 2 and a plurality of first balls 12 and second balls 13. The first shaft 2 has, on a circumferential surface 4, a plurality of first ball tracks 8 extending along an axis of rotation 5 over at least a first section 6 and a second section 7. The shaft coupling 1 also comprises the second shaft 3 with a plurality of second ball tracks 23 extending along the axis of rotation 5, in which third balls 26 are arranged.

The balls 12, 13 can be displaced between the positions within the respective section 6, 7 along the first ball tracks 8. The balls 12, 13 are arranged in alignment with the apertures 14, 15 in the circumferential direction 9 in the decoupled position shown. In the first section 6, a first end face 16 of the first webs 10 pointing towards the first apertures 14 is smaller than in the second section 7 a second end face 17 pointing towards the second apertures 15.

As a result of the reduction in size of the first end face 16 compared to the second end faces 17, entry of the first balls 12 into the first ball tracks 8 (or into the region between the first webs 10) can be facilitated. The angular distance 37 (indicated here) between two first ball tracks 8 is thus in an example actually reduced, whereby in addition a clearance between first balls 12 and the first webs 10 of the first ball track 8 that is present with respect to the circumferential direction 9 is increased, at least in the region of the first end face 16.

The first end face 16 of the first webs 10 is reduced in such a way that a first inlet opening 19 of the first ball track 8 is enlarged. In the process, the first inlet opening 19 of the first ball track 8 is enlarged in the circumferential direction 9.

A chamfer 18 adjoins the first end face 16 of the first web 10. The chamfer 18 is inclined towards one of the first ball tracks 8 arranged adjacent to the first web 10. The chamfer 18 forms a first inlet opening 19 of the first ball track 8, which is enlarged in the circumferential direction 9. As a result of the chamfer 18, a width 20 of the first ball track 8 tapers increasingly starting from the first inlet opening 19 and along the axis of rotation 5. The width 20 of the first ball track 8 extending in the circumferential direction 9 is therefore maximum at the position along the axis of rotation 5, at which the first end face 16 is arranged, and tapers progressively from there to the (then constant) minimum width 20 of the first ball track 8.

The minimum width 20 of the first ball track 8 in the first section 6 is the same size as the minimum and constant width 20 of the first ball track 8 in the second section 7.

The chamfer 18 comprises a recess of the edge forming the transition between the first end face 16 and the track side wall of the first web 10.

In the decoupled position, the first balls 12 are arranged along the axis of rotation 5 at a first distance 21 from the first end faces 16 and the second balls 13 are arranged at a second distance 22 from the second end faces 17. The second distance 22 is greater than the first distance 21.

The difference between the first distance 21 and the second distance 22 is such that the first balls 12 initially exit the first apertures 14 along the axis of rotation 5 and enter the first ball tracks 8 via the enlarged first inlet opening 19. As a result of the increasing narrowing of the width 20 starting from the first inlet opening 19, the first balls 12 are increasingly aligned with respect to the first ball tracks 8 as the displacement 29 of the first balls 12 along the axis of rotation 5 progresses. The second distance 22 is such that the second balls 13 only enter the first ball tracks 8 in the second section 7 from the second apertures 15 when the first balls 12 in the first section 6 have reached the minimum width 20.

This makes it easier to thread the first balls 12 through the first section 6. By threading only the first balls 12 into the first ball tracks 8 and by successively better aligning the first balls 12 with the first shaft 2 via the chamfers 18, the second balls 13 can be aligned with the first ball tracks 8 in the second section 7. This allows the switching times to be reduced and the switching process to be simplified. The transmission of a torque is not impaired in the process.

REFERENCE SIGN LIST

1 shaft coupling
2 first shaft
3 second shaft
4 circumferential surface
5 axis of rotation
6 first section
7 second section
8 first ball track
9 circumferential direction
10 first web
11 second web
12 first ball
13 second ball
14 first aperture
15 second aperture
16 first end face
17 second end face
18 chamfer
19 first inlet opening
20 width
21 first distance
22 second distance
23 second ball track
24 sleeve
25 third ball track
26 third ball
27 first pair of tracks
28 second pair of tracks
29 displacement
30 radial direction
31 cage
32 axial direction
33 distance
34 actuating device
35 spring element
36 stop
37 angular distance
38 angular range
39 effective diameter

The invention claimed is:

1. A shaft coupling for the switchable connection of a first shaft to a second shaft arranged coaxially thereto, comprising:
  the first shaft, including a circumferential surface having thereon a plurality of first ball tracks extending along an axis of rotation over at least a first section and a second section, the first ball tracks being spaced apart from one another along a circumferential direction in the first section by first webs and in the second section by second webs, as well as a plurality of first balls arranged in the first section and a plurality of second balls arranged in the second section;
  wherein the first ball tracks are connected to each other in the first section along the circumferential direction via first apertures arranged in alignment with each other along the circumferential direction, and are connected to each other in the second section via second apertures arranged in alignment with each other along the circumferential direction;
  wherein the shaft coupling is switchable at least between two positions and the balls are displaceable between the positions within the respective section along the ball tracks;
  wherein the balls, in a coupled position, are arranged in the circumferential direction in alignment with the webs and, in a decoupled position, in alignment with the apertures;
  wherein in the first section a first end face of the first webs pointing towards the first apertures is smaller than in the second section a second end face pointing towards the second apertures.

2. The shaft coupling of claim 1, wherein a chamfer adjoins the first end face towards one of the first ball tracks arranged adjacent to the first web, whereby a first inlet opening of the first ball track, which is enlarged in the circumferential direction, is formed;
  wherein a width of the first ball track, starting from the first inlet opening and along the axis of rotation, becomes increasingly narrower as a result of the chamfer.

3. The shaft coupling of claim 1, wherein respective chamfers adjoin the first end face towards the first ball tracks arranged adjacent to the first web, whereby a first inlet opening of the first ball tracks, which is enlarged in the circumferential direction, is formed;
  wherein a width of the first ball tracks, starting from the first inlet opening and along the axis of rotation, becomes increasingly narrower as a result of the chamfers.

4. The shaft coupling of claim 1, wherein the first end face is at most 95% of the second end face.

5. The shaft coupling of claim 1, wherein, in the decoupled position, the first balls are arranged along the axis of rotation at a first distance from the first end faces and the second balls are arranged at a second distance from the second end faces, the first distance being less than the second distance.

6. The shaft coupling of claim 1, further comprising:
the second shaft with a plurality of second ball tracks extending along the axis of rotation and a sleeve at least partially covering the first ball tracks and the second ball tracks along the axis of rotation, the sleeve comprising third ball tracks and third balls;
wherein the first and second balls are arranged in first track pairs formed by the first ball tracks with the third ball tracks and the third balls are arranged in second track pairs formed by the second ball tracks with the third ball tracks;
wherein the balls can be displaced between the positions along the ball tracks by displacement of the sleeve along the axis of rotation, so that in the coupled position the shafts are non-rotatably connected to one another and in the uncoupled position are rotatable relative to one another.

7. The shaft coupling of claim 6, wherein the shafts are arranged side by side along the axis of rotation and the sleeve extends in a radial direction externally beyond the first ball tracks and the second ball tracks, wherein the third ball tracks form outer ball tracks and form the first track pairs with the inner first ball tracks and the second track pairs with the inner second ball tracks.

8. The shaft coupling of claim 6, wherein first ball tracks and the second ball tracks overlap one another along the axis of rotation and the sleeve is arranged along a radial direction between the first ball tracks and the second ball tracks, wherein one shaft has inner ball tracks and the other shaft has outer ball tracks, wherein the sleeve has inner third ball tracks and outer third ball tracks.

9. The shaft coupling of claim 1, wherein the first shaft has a plurality of second sections which are arranged adjacent to one another along the axis of rotation.

10. The shaft coupling of claim 1, wherein a cage is arranged between the sleeve and each shaft, the balls being arranged, via the cage, at fixed distances from one another at least with respect to an axial direction extending along the axis of rotation.

11. A shaft for a shaft coupling, comprising:
a circumferential surface having thereon a plurality of first ball tracks which extend along an axis of rotation over at least a first section and a second section and which are arranged spaced apart from one another along a circumferential direction in the first section by first webs and in the second section by second webs;
wherein the first ball tracks in the first section are connected to one another along the circumferential direction via first apertures arranged in alignment with one another along the circumferential direction and in the second section are connected to one another along the circumferential direction via second apertures arranged in alignment with one another along the circumferential direction;
wherein in the first section a first end face of the first webs pointing towards the first apertures is smaller than in the second section a second end face pointing towards the second apertures.

* * * * *